United States Patent [19]
Beehler

[11] 3,709,531
[45] Jan. 9, 1973

[54] SHAFT AND HUB ASSEMBLY AND IMPROVED CLIP FASTENER THEREFOR

[75] Inventor: Richard F. Beehler, Beach Grove, Ind.

[73] Assignee: Lau Incorporated, Dayton, Ohio

[22] Filed: April 8, 1971

[21] Appl. No.: 132,347

[52] U.S. Cl.................................287/53 H, 74/553
[51] Int. Cl..............................................F16d 1/06
[58] Field of Search...287/53 H, 53 R; 292/353, 349; 74/553, 548

[56] References Cited

UNITED STATES PATENTS

| 2,291,560 | 7/1942 | Rhodes | 287/53 H |
| 2,656,210 | 10/1953 | Kump | 292/353 |
| 2,154,537 | 4/1939 | Stenberg | 287/53 H |

FOREIGN PATENTS OR APPLICATIONS 543,382  3/1956  Italy........................................74/553

Primary Examiner—Andrew V. Kundrat
Attorney—Marechal, Biebel, French & Bugg

[57] ABSTRACT

The fan hub is attached to a drive shaft by means of a generally C-shaped clip member which has an arched or curved leg positioned in a slot on the hub between the hub and a flat formed on the drive shaft. The clip member is first positioned on the shaft and then the hub is slid into place flattening the curvature of the leg of the clip member and driving a pair of barbs into frictional engagement with the shaft providing a torque and thrust transmitting connection. An upper portion of the clip member drops into a detent opening formed on the hub for retaining the clip member, hub, and shaft in assembled relation.

6 Claims, 6 Drawing Figures

PATENTED JAN 9 1973 3,709,531
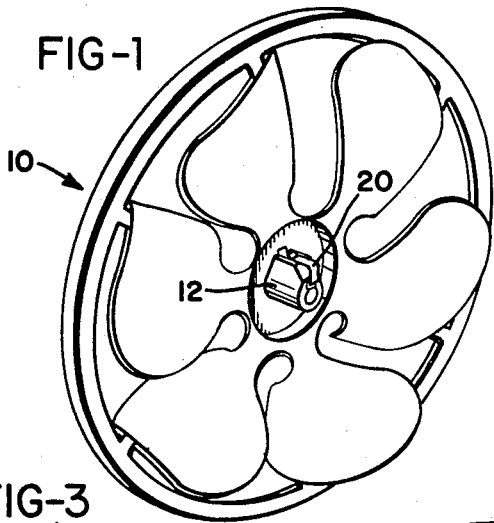
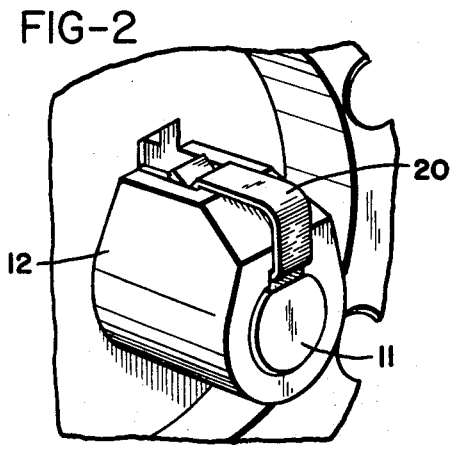
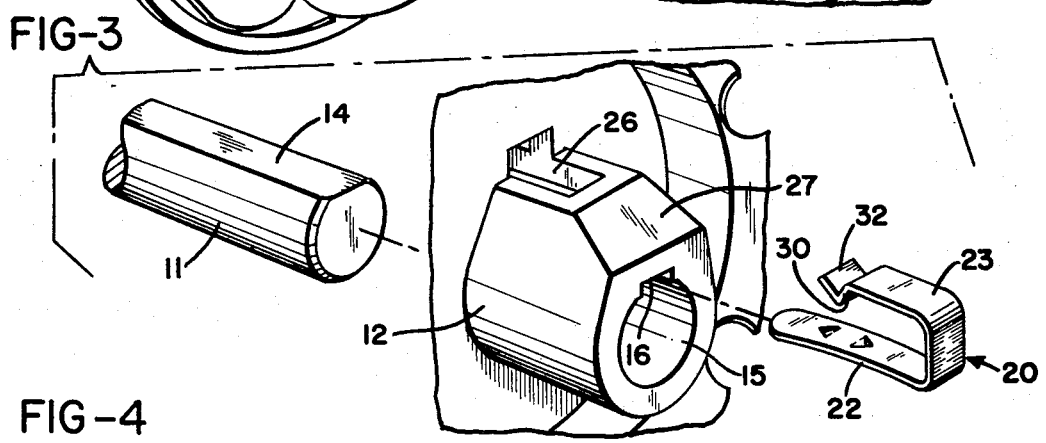
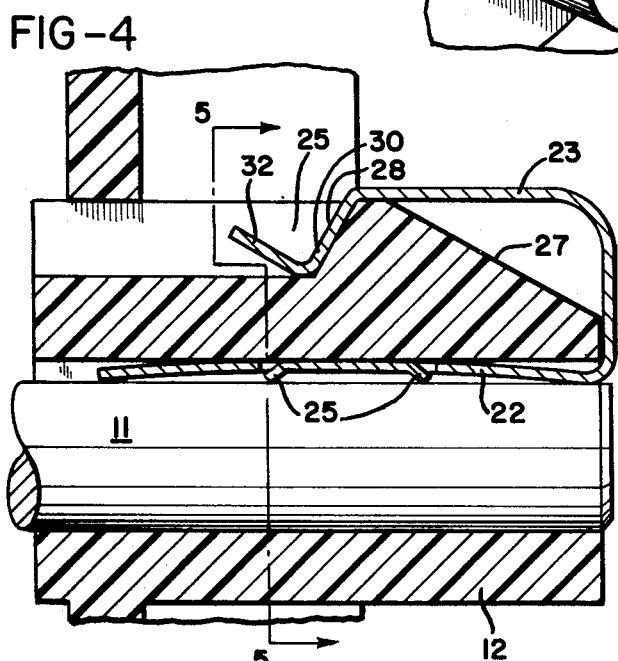
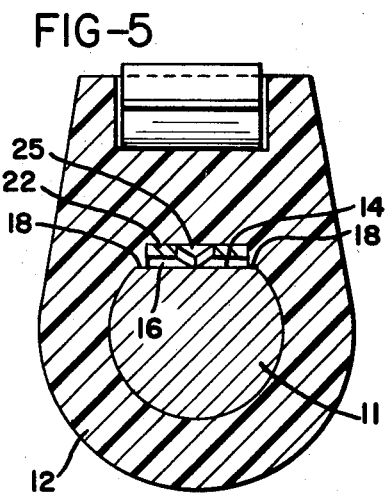
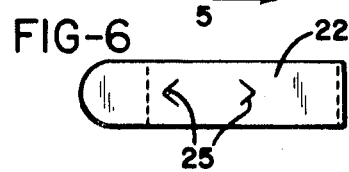
INVENTOR
RICHARD F. BEEHLER
BY
Marechal, Biebel, French & Bugg
ATTORNEYS

SHAFT AND HUB ASSEMBLY AND IMPROVED CLIP FASTENER THEREFOR

BACKGROUND OF THE INVENTION

For relatively low torque applications, it is desirable to retain a hub on a shaft by means of a removable fastener. The fastener arrangement ideally should provide for both torque and thrust transmission. The latter is particularly desirable where the hub forms an integral part of a fan.

One arrangement which has been used is that of a hub which is formed with a number of radial slits which define a series of longitudinally extending hub sections. An encircling clamp is received over the hub sections to deflect them radially inwardly into frictional gripping relation with the shaft. This arrangement has the disadvantage of providing for relatively low torque and thrust transmission, and has the further disadvantage that the clipping relation between the hub and the shaft is dependent upon the material of the hub and the coefficient of friction between the hub and the shaft.

A particular application or use of a hub and shaft retaining fastener as described is with a plastic molded fan where the hub itself is formed of a plastic material. Typically, such materials exhibit a low coefficient of friction with metal and the split hub and encircling clamp arrangement has generally been relatively ineffective for retaining such fan hubs on shafts over a variety of operating conditions.

SUMMARY OF THE INVENTION

The present invention is directed to an improved shaft and hub assembly in combination with a fastener, and to the fastener itself, for retaining a hub on a shaft. The invention is particularly applicable for the retention of hubs made of plastic material, but the principles may be applied to hubs made of any material, and a particular advantage resides in the fact that the attaching arrangement is independent of the material of the hub.

The shaft is provided with a flat, and the hub is formed with a longitudinal opening or recess which is in alignment with the flat. A retainer clip, preferably made of spring steel, has a curved leg portion which is proportioned to be positioned within the opening defined between the hub and the shaft, accompanied by a flattening of the leg portion. One or more barbs are cut or formed on the outer surface of the leg portion for gripping engagement with the flat surface of the shaft.

The fastener itself is of a generally C-shaped construction and thus has an upper clip portion which is adapted to be received over a detent formed on the hub outer surface. The shaft and the hub are assembled relative to each other by placing the fastener leg on the shaft flat and then sliding the hub in place while holding the fastener until the outer clip portion of the fastener snaps over the hub detent. When the hub is slid in place, the leg of the fastener is essentially flattened driving the barbs into the shaft. At the same time, the clip portion is received in the hub detent. Disassembly, when necessary, may be accomplished simply by lifting the clip portion and then sliding the hub off of the shaft.

The longitudinal space which is defined between the hub and the flat of the shaft is such as to cause a flattening of the fastener leg during assembly. The leg thus is in a stressed condition and provides a metal-to-metal gripping of the shaft which is independent of the material of the hub. Additionally, the spring tension applies a radial force between the shaft and the hub which causes the hub to run true on the shaft and which provides good torque transmitting characteristics.

It is accordingly an important object of the invention to provide an improved arrangement for attaching a hub, particularly a molded or plastic hub, to a shaft.

Another object of the invention is the provision of a novel fastener for retaining a hub on a shaft.

A still further object of the invention is the provision of a hub and shaft assembly, as outlined above, in which a hub is removably secured to a shaft by a spring clip-like fastener and in which the attachment is not dependent upon the composition or the coefficient of friction of the hub material.

These and other objects and advantages of the invention will be apparent from the following description, the accompanying drawings and the appended claims.

BRIEF DESCRIPTION OF THE DRAWINGS

FIG. 1 is a perspective view of a plastic molded fan blade having a hub attachment arrangement according to this invention;

FIG. 2 is an enlarged fragmentary perspective of the hub assembly of FIG. 1;

FIG. 3 is an exploded perspective of the parts of FIG. 2;

FIG. 4 is an enlarged section through the hub assembly;

FIG. 5 is a transverse section taken generally along the line 5—5 of FIG. 4; and FIG. 6 is a bottom plan view of the fastener.

DESCRIPTION OF THE PREFERRED EMBODIMENT

A fan, having a hub according to the present invention, is illustrated generally at 10 in FIG. 1. The fan 10 may be of molded plastic which is adapted to be received onto a drive shaft 11. The fan 10 is formed with a central hub which is illustrated generally at 12.

The shaft 11 has means thereon defining a flat 14 on a longitudinal surface thereof. The hub 12 is adapted to be received on the shaft 11 and is provided with a circular shaft opening 15 and with a longitudinal recess 16 opening into the shaft opening 15.

The recess 16 is preferably formed the full axial length of the hub, and has a transverse width which preferably is somewhat less than the corresponding width of the flat 14 to define a pair of longitudinally extending ledges 18, as best viewed in FIG. 5. The ledges 18 have flat lower surfaces which engage corresponding edges of the flat 14 and assist in resisting rotation of the hub 12 on the shaft 11.

A clip-like spring fastener for joining the hub to the shaft is illustrated generally at 20, as best seen in FIG. 3. The fastener 20 is preferably formed of spring steel which may be tempered to a hardness of 40-50 Rockwell, and is formed with a longitudinally extending leg 22 and an upper or outer clip portion 23 which is in partially overlying relation to the leg 22. Thus, when viewed from the side, the fastener 20 is generally C-shaped except that the longitudinal length of the leg 22 may exceed the corresponding length of the clip portion 23.

The leg 22 of the fastener 20 is formed with a longitudinal curvature with the concavity thereof facing outwardly or away from the clip and toward the shaft in the assembled position. Means on the leg 22 defines detent means consisting of a pair of oppositely extending or directed barbs 25. The barbs 25 may comprise triangular sections of the leg material which has been pierced or punched and angled outwardly of the leg on the concave side thereof to present a pair of oppositely directed sharp points.

The longitudinal space between the flat 14 and the hub 12 defined by the slot 16 is somewhat less than that which is defined by the arcuate curvature of the leg 22. The width of the slot corresponds generally in width to that of the fastener 20. Thus, when the fastener 20 is received with the leg 22 between the hub and the shaft, it is accompanied by a flattening movement of the leg 22 with the result that the barbs 25 are pressed firmly against the flat 14, as viewed in FIG. 4.

The outer surface of hub 12 is formed with a detent 26 radially outwardly of the keyway or slot 16, as illustrated in FIGS. 3 and 4. A detent 26 may consist of a recess which is separated from the front surface of the hub by a forward inclined wall 27 and a rearward and more steeply inclined wall 28 as shown in FIG. 4. The terminal end of the clip portion 23 is provided with a downwardly turned section 30 and an upwardly turned end 32. The section 30 is adapted to be received over the wall 28 and the end 32 provides an incline to assist the clip portion in rising over the wall 27. The end 32 further provides means for engaging and lifting the clip portion 23 when it is desired to remove the hub from the shaft.

In use, the fastener 20 is placed on the shaft 11 and the hub 12 is moved axially in place accompanied by relative movement of the hub over the leg 22 of the fastener. Since the radial dimension defined by the slot 16 is less than the space occupied by the curvature of the leg 22, this movement is accompanied by flattening of the leg, driving the barbs 25 into the surface of the flat 14. The ledges 18 also engage the corresponding longitudinal edges of the flat 14 and resist turning movement of the shaft.

The hub is in place when the portion 30 is received within the detent recesses 26. The leg 22 exerts a radial force between the hub and the shaft. Since the leg substantially fills the keyway 16, it provides for both rotational torque and axial thrust transmission. When it is desired to remove the hub from the shaft, it is only necessary to lift the clip portion 23 and slide the hub axially. The barbs 25 effectively prevent the fastener 20 from moving axially with respect to the shaft 11.

While the form of apparatus herein described constitutes a preferred embodiment of the invention, it is to be understood that the invention is not limited to this precise form of apparatus, and that changes may be made therein without departing from the scope of the invention.

What is claimed is:

1. A shaft and hub assembly in combination with a fastener for transmitting torque and thrust comprising a drive shaft, means on said shaft defining a flat along a longitudinal surface thereof, a hub adapted to be received on said shaft having a longitudinal slot positioned radially opposite said shaft flat and defining with said flat a longitudinal clearance space, a clip-like spring fastener formed of essentially flat stock material having an extended longitudinally curved leg with the concave side of the curvature thereof facing said flat and adapted to be received in said clearance space accompanied by a flattening movement of said leg, means on said leg surface adjacent said flat defining at least one protuberance which is engageable with said flat for preventing longitudinal movement of said fastener on said shaft, and means retaining said fastener on said hub.

2. The assembly of claim 1 in which said slot is formed with a transverse width less than the corresponding width of said flat defining a pair of longitudinally extending hub edges which directly engage said flat for resisting rotation of said hub on said shaft.

3. The assembly of claim 1 in which said fastener is formed with a curved outer clip portion longitudinally overlying said leg and engageable with said hub at an outer surface thereof.

4. The assembly of claim 3 further comprising detent means on said hub engageably by said clip portion.

5. A shaft and hub assembly in combination with a fastener for transmitting torque and thrust comprising a drive shaft, means on said shaft defining a flat along a longitudinal surface thereof, a hub adapted to be received on said shaft having a longitudinal slot positioned radially opposite said shaft flat and defining with said flat a longitudinal clearance space, a clip-like spring fastener having an extended longitudinally curved leg adapted to be received in said clearance space accompanied by a flattening movement of said leg, means on said leg outer surface defining a pair of longitudinally spaced said barbs which have oppositely directed shaft engaging portions engageable with said shaft for preventing longitudinal movement of said fastener on said shaft, and means for retaining said fastener on said hub.

6. A unitary spring steel clip fastener for connecting a hub having a longitudinal internal slot to a shaft having a flat positionable opposite such slot, comprising a longitudinally extending curved leg portion adapted to be received by flattening in such slot in frictional engagement with the shaft at such flat, a partially encircling outer clip portion adapted to be received in a detent or recess on such hub, the curvature of said leg portion facing outwardly from said clip portion and toward the flat, and means in said leg portion defining a pair of oppositely facing barbs for frictional engagement with such flat.

* * * * *